USOO5941010A

United States Patent [19]
Latwesen

[11] Patent Number: 5,941,010
[45] Date of Patent: Aug. 24, 1999

[54] METHOD OF BAITING FISH HOOKS, AND BAITED FISH HOOKS

[76] Inventor: David G. Latwesen, 5107 W. Russett Ct., Spokane, Wash. 99208

[21] Appl. No.: 09/130,591

[22] Filed: Aug. 6, 1998

[51] Int. Cl.$^6$ .......................... A01M 27/00; A01K 85/00; A23L 29/00; A01N 25/00
[52] U.S. Cl. ............................ 43/4.5; 43/1; 43/42; 426/1; 424/84; 424/410
[58] Field of Search ................................ 43/1, 42, 35, 55, 43/4, 17.1, 4.5, 42.53; 426/1; 424/84, 410

[56] References Cited

U.S. PATENT DOCUMENTS 4,878,310  11/1989  Hannon et al. .......................... 43/42.04

Primary Examiner—Michael J. Carone
Assistant Examiner—Fredrick T. French, III
Attorney, Agent, or Firm—Wells, St. John, Roberts, Gregory & Matkin, P.S.

[57] ABSTRACT

In one aspect, the invention encompasses a fish bait comprising a fish attractant and at least one magnet within the fish attractant. In another aspect, the invention encompasses a fish bait comprising a fish attractant and a plurality of magnetizable particles distributed throughout the fish attractant to a concentration sufficient to adhere a visible amount of the fish attractant to a metallic fishhook under conditions wherein either at least some of the magnetizable particles are magnetic or the fishhook is magnetic. In yet another aspect, the invention encompasses a fishing bait and hook kit, comprising: a) a magnetic hook; and b) a bait having one or more magnetizable particles distributed therein.

28 Claims, 2 Drawing Sheets

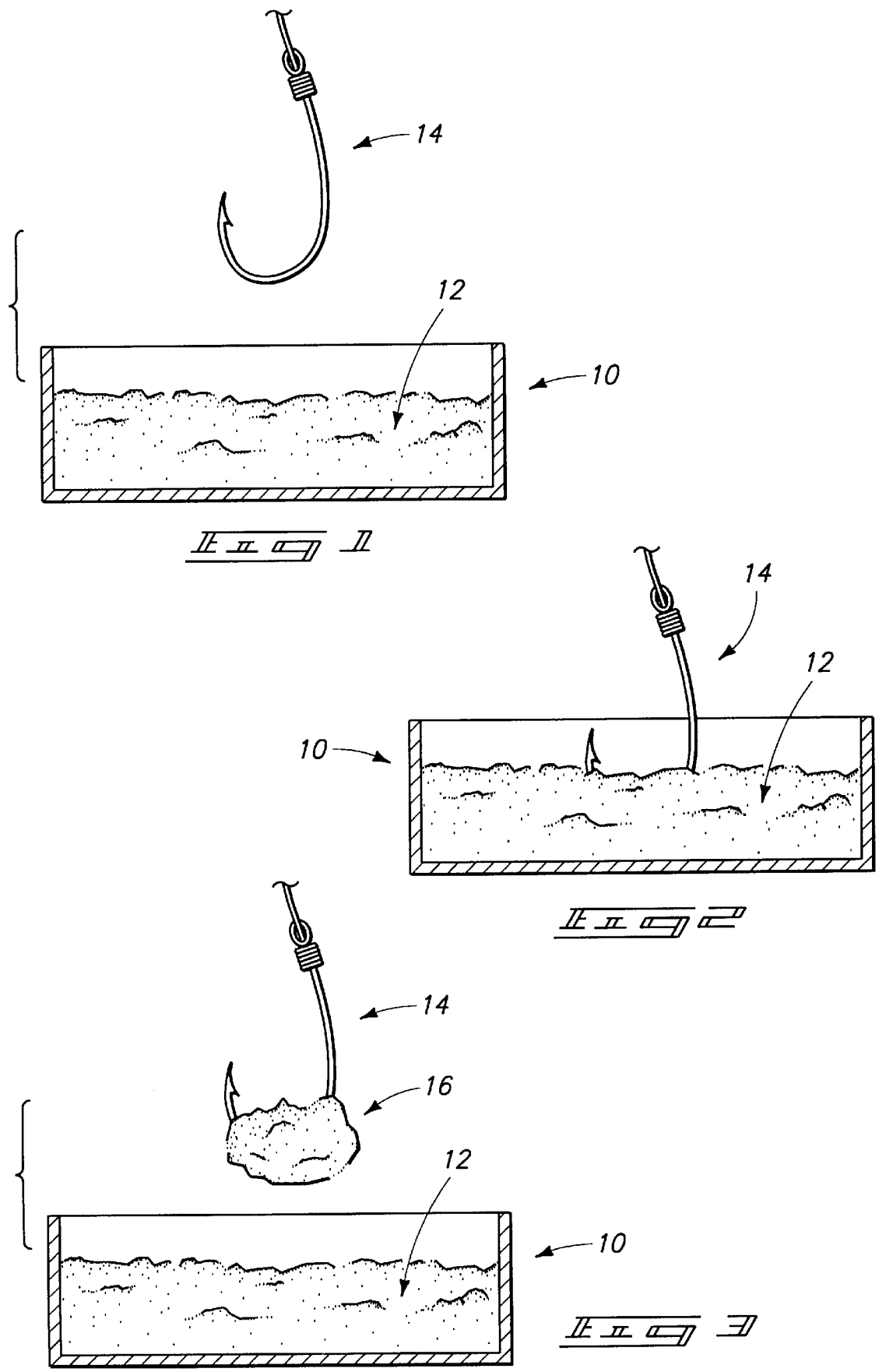

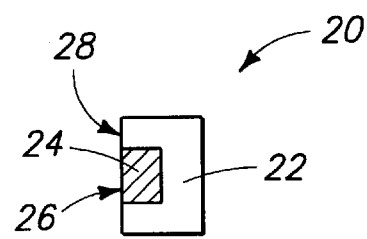
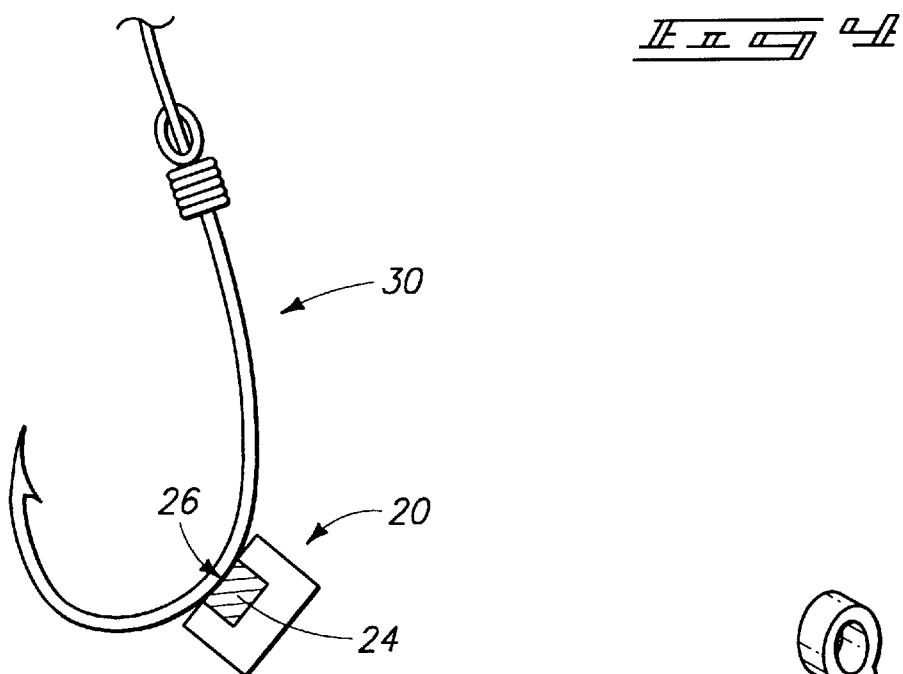
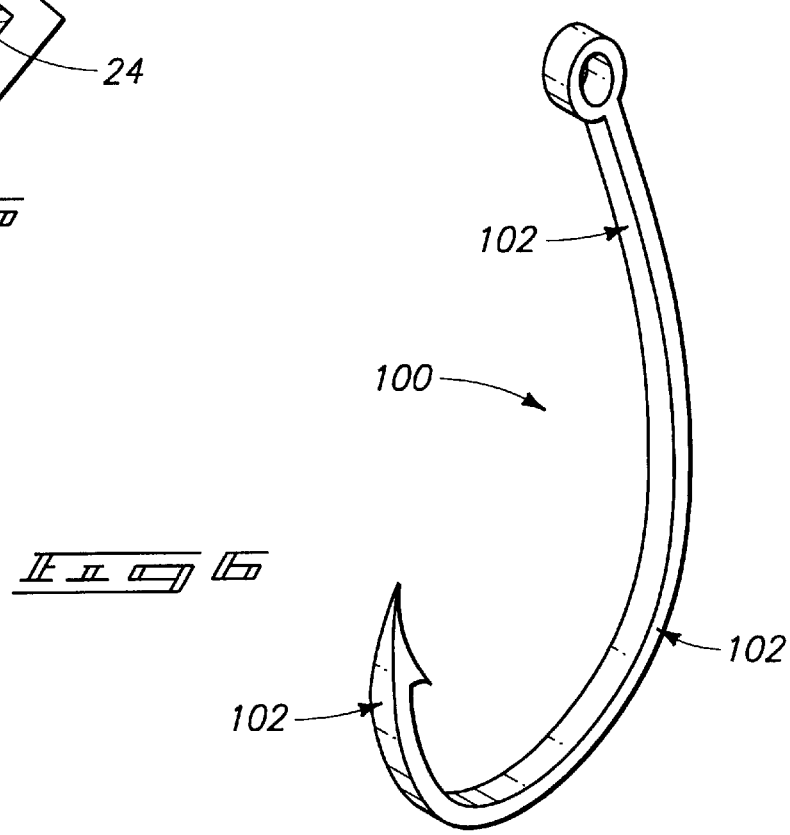

METHOD OF BAITING FISH HOOKS, AND BAITED FISH HOOKS

TECHNICAL FIELD

The invention pertains to fishing baits, fishing hooks, and kits comprising fishing baits and fishing hooks.

BACKGROUND OF THE INVENTION

Fishing baits commonly comprise relatively soft materials that are adhered to a fishhook either by, for example, molding the materials around the fishhook, or by impaling the materials onto the fishhook. Among the baits that are molded around a fishhook are baits having a relatively dough-like consistency such as, for example. PowerBait®, which is distributed by Berkley of Spirit Lake, Iowa. Dough consistency baits can also be formed into small nuggets and impaled on a fishhook. For instance, PowerBait® nuggets are distributed by Berkley under the registered trademark "Power Nugget®". Other baits that can be molded or impaled onto fishhooks are, for example, marshmallows, small pieces of cheese, and kernels of corn.

A difficulty in using baits can occur in securing the baits to a hook. For instance, many of the dough-type baits can become difficult to work with when moistened. Specifically, the baits can become slimy and difficult to adhere to a hook. Also, many baits comprise one or more odoriferous fish attractants, the smell of which can be disagreeable or offensive to persons utilizing the baits. Accordingly, such persons would prefer to not manually touch the bait. Difficulties in securing baits to a hook can further be manifested by the baits falling off the hook prematurely upon casting a baited hook, or upon receiving a "nibble" from a striking fish. A nibble can occur when a fish lightly touches or "tastes" the bait, and before the fish fully envelops the baited hook in its mouth.

For the above-discussed reasons, it would be desirable to develop improved baits which can be adhered to a hook without actually touching the baits, and which can be retained on a hook better than some of the existing baits.

SUMMARY OF THE INVENTION

In one aspect, the invention encompasses a fish bait comprising a fish attractant and at least one magnet within the fish attractant.

In another aspect, the invention encompasses a fish bait comprising a fish attractant and at least one magnetizable particle within the fish attractant. The magnetizable particle is positioned within the attractant at a location wherein it can adhere the attractant to a fishhook under conditions wherein one or both of the magnetizable particle and the fishhook is magnetized.

In yet another aspect, the invention encompasses a fishing bait and hook kit. Such kit includes a magnetic hook and a bait having one or more magnetizable particles distributed therein.

BRIEF DESCRIPTION OF THE DRAWINGS

Preferred embodiments of the invention are described below with reference to the following accompanying drawings.

FIG. 1 is a cross-sectional, diagrammatic, fragmentary view of a fish bait encompassed by the present invention, and a fishhook. FIG. 1 illustrates a preliminary stage of a method of baiting a fishhook in accordance with the present invention.

FIG. 2 illustrates the bait and fishhook of FIG. 1, at a fish-hook-baiting step subsequent to that of FIG. 1.

FIG. 3 illustrates the bait and fishhook of FIG. 1, at a fish-hook-baiting step subsequent to that of FIG. 2.

FIG. 4 illustrates a cross-sectional, fragmentary, diagrammatic view of a second embodiment bait of the present invention.

FIG. 5 illustrates the bait of FIG. 4 adhered to a fishhook.

FIG. 6 is a diagrammatic, perspective view of a fishhook embodiment of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In one aspect, the invention encompasses a fish bait comprising a fish attractant and one or more magnetizable particles distributed throughout the fish attractant. The fish attractant can comprise, for example, a consistency of a dough or a gel, and can, for example, comprise PowerBait®. Alternatively, the attractant can be in the form of a powder. As yet another alternative, the attractant can be in the form of a marshmallow, piece of cheese, piece of corn, etc. In preferred embodiments of the invention, the fish attractant will release particles when exposed to water, with the particles being detectable by fish through at least one of the senses of smell and taste.

The magnetizable particles are preferably provided within the bait to a concentration sufficient to adhere a visible amount of the fish attractant to a metallic fishhook under conditions wherein either 1) some of the magnetizable particles are magnetic, 2) the fishhook is magnetic, or 3) both the fishhook and at least some of the metallic particles are magnetic. For purposes of interpreting this disclosure and the claims that follow, the terms "magnet" and "magnetic" are defined as follows. The term "magnet" indicates an object that is itself a so-called "permanent magnet". A "permanent magnet" being defined in accordance with the art to be a magnet that retains a remnant magnetic field in the absence of an external magnetizing field. Thus, if a fishhook is referred to as a magnet, it is meant that the fishhook has a remnant magnetic field in the absence of any magnet external to the fishhook. The term "magnetic" refers to an object that is either itself a magnet, or that is magnetized by being in contact with a magnet or an electric field. Thus, the term "magnetic fishhook" encompasses fishhooks that are magnets, as well as fishhooks that, while not magnets themselves, are magnetized by interaction with a magnet. An exemplary configuration of a magnetic fishhook which is not itself a magnet is a fishing lure comprising a magnetic spoon in physical contact with the hook. Also for purposes of interpreting this disclosure and the claims that follow, a "visible amount" of bait is defined to refer to a size and/or quantity of bait visible to a person of ordinary vision, from arm's length, under daylight conditions.

The magnetizable particles distributed in the bait preferably comprise ferromagnetic components. Such ferromagnetic components can comprise one or more of iron, nickel and cobalt. An amount of magnetic adhesion between a hook and magnetizable particles within a fish bait can be varied by altering an amount of ferromagnetic materials within the hook and/or within the magnetizable particles of the fish bait. Accordingly, to increase adhesion of a fish bait to a hook, the amount of ferromagnetic materials in the hook and/or in the magnetizable particles can be increased.

The magnetizable particles can be in the form of, for example, metal filings, a powder, or a powder trapped in organic polymer. Powders trapped in organic polymers can be advantageous over other magnetizable materials in that corrodible components of the magnetizable materials can be protected from corrosion by the organic polymer.

At least some of the magnetizable particles distributed in the bait can be magnets. Such particles will then adhere to fishhooks comprising iron or other ferromagnetic materials. The magnet particles can be in the form of flecks or other small pieces, and can comprise, for example, ground portions of a flexible magnet. Flexible magnets commonly comprise magnetic particles trapped within an organic polymer. Flexible magnets can be purchased as extruded flexible strips. (Exemplary flexible magnets are sold by Magnet Sales & Manufacturing of Culver City, Calif.)

In alternative embodiments of the invention, none of the magnetizable particles within the bait are magnets. In such embodiments, the magnetizable particles can be used in conjunction with a fishhook that is a magnet, and will thus adhere to the fishhook.

In yet other alternative embodiments, at least some of magnetizable particles can be magnets, and can be used together with a fishhook that is also a magnet. In such embodiments, the magnetizable particles can adhere more tightly to the fishhook than they would in embodiments wherein either the magnetizable particles or the fishhook were not a magnet.

In embodiments wherein the magnetizable particles are dispersed throughout a powdered fish bait, gel fish bait, or dough-type fish bait, the particles are preferably relatively small. Small particles can generally be more easily homogeneously dispersed throughout a fish bait than large particles. Exemplary particles for dispersing in powder baits, gel baits or dough baits have a minimum dimension of greater than 0 inch and a maximum dimension of less than about 0.25 inch. The magnetizable particles are preferably provided within the bait to a concentration of greater than about 1% by weight, and can be provided to, for example, a concentration from about 1% to about 99.9% by weight, or, as another example, a concentration of from about 25% to about 95%, by weight.

An embodiment of the present invention wherein magnetizable particles are dispersed in a bait is described with reference to FIGS. 1–3. FIG. 1 illustrates a vessel 10 containing a fish bait 12 comprising magnetizable particles, and a metal-containing fishhook 14 provided above bait 12. Either fishhook 14 is a magnet, or at least some of the magnetizable particles are magnets, or both the fishhook and at least some of the magnetizable particles are magnets.

Fish bait 12 has a granular consistency and comprises magnetizable particles coated with a powdered fish attractant. Fish bait 12 can be formed by, for example, providing an adhesive over magnetizable particles and subsequently dusting the adhesive-covered particles with a fish attractant powder. The adhesive adheres the powder to the magnetizable particles. The magnetizable particles can be formed by, for example, grinding a flexible magnet. A suitable adhesive can comprise, for example, a glue or paste, and can be applied to the magnetizable particles by, for example, spraying or dipping. A suitable fish attractant powder can be formed by, for example, crushing fish food (for example, Purina® Trout Chow, which is available from Ralston Purina Company of St. Louis, Mo.) into a dust.

Referring to FIG. 2, fishhook 14 is dipped into bait 12. The magnetizable particles then adhere to fishhook 14 through magnetic interactions to adhere a visible amount of bait 12 to fishhook 14.

Referring to FIG. 3, fishhook 14 is withdrawn from vessel 10. Fishhook 14 is now coated with a visible portion 16 of bait 12.

The embodiment of the invention described in FIGS. 1–3 can be utilized by a person to bait a hook without such person actually touching bait 12. The invention encompasses other embodiments wherein magnetizable particles are distributed throughout a bait, and wherein the bait is subsequently molded to a hook or embedded over the tip of the hook. Such alternative embodiments can comprise, for example, distributing magnetizable particles throughout a dough-type bait. In such alternative embodiments, a person will generally touch the bait when baiting a hook. Also in such alternative embodiments, the magnetizable particles can provide an advantage relative to baits lacking the magnetizable particles in that the particles can assist in adhering the bait to the hook. Accordingly, the bait can be better retained on the hook during casting, and during a fish "nibble," than would a bait lacking the magnetizable particles.

Another embodiment of the invention is described with reference to FIGS. 4 and 5. Referring to FIG. 4, a bait 20 is shown in cross-sectional side view. Bait 20 comprises a block of fish attractant material 22, and a magnetizable particle 24 embedded within block 22. Block 22 can comprise, for example, a marshmallow, piece of cheese, or piece of corn. Alternatively, block 22 could comprise a dough-type bait molded into the shape of block 22. Magnetizable particle 24 can be a magnet. The size of magnetizable particle 24 can vary depending on the size of block 22. Preferably, magnetizable particle 24 will comprise at least about 1% of the weight of bait 20, and particle 24 can comprise greater than 10% of the weight of bait 20. In the shown embodiment, only one magnetizable particle is provided within block 22. However, it is to be understood that the invention encompasses other embodiments wherein more than one magnetizable particle is provided within a single block 22 of bait 20.

The shown magnetizable particle 24 comprises an exposed outer surface 26 which is substantially planar with an outer peripheral surface 28 of block 22 proximate to exposed surface 26. The invention covers other embodiments (not shown) wherein exposed outer surface 26 is either recessed relative to outer peripheral surface 28, or projects outwardly further than outer surface 28, as well as other embodiments (not shown) wherein magnetizable particle 24 is embedded within block 22 to an extent such that no surface of magnetizable particle 24 is exposed.

Referring to FIG. 5, bait 20 is shown adhered to a metallic fishhook 30. One or both of magnetizable particle 24 and fishhook 30 is a magnet, and magnetizable particle 24 adheres to fishhook 30 through magnetic forces. An advantage of having surface 26 of particle 24 exposed is that magnetic attraction between particle 24 and hook 30 is strongest when a distance between particle 24 and hook 30 is minimized. By enabling outer surface 26 to physically contact hook 30, magnetic interactions between hook 30 and magnetizable particle 24 can be maximized.

It is noted that the shown embodiment can enable hook 30 to be adhered to bait 20 without a person actually touching bait 20. Rather, bait 20 can be within a jar or other vessel, and hook 30 inserted into the jar until one or more of baits 20 adhere to hook 30 through magnetic interactions. Hook 30 can then be withdrawn with the baits adhered thereto.

FIG. 6 illustrates yet another embodiment of the invention wherein a fishhook 100 is formed to have planar side regions. In the shown embodiment, fishhook 100 is formed of a wire having a square cross-section. Hook 100 thus comprises four planar side regions 102 (only three of which are visible in the FIG. 6 view). Planar side regions 102 can improve magnetic adhesion between hook 100 and magnetizable particles. Specifically, in embodiments which magnetizable particles have planar surfaces, the embodiment of FIG. 6 can enable a larger portion of the planar surfaces of the magnetizable particles to physically contact surfaces of the hook than would occur if hook 100 lacked the planar surfaces 102. The additional surface contact can increase magnetic adhesion forces between hook 100 and the magnetizable particles. In the shown embodiment, the planar side regions 102 extend entirely along a length of hook 100. However, it is to be understood that the invention encompasses other embodiments (not shown) wherein planar regions are provided along only portions of hook 100.

In another aspect of the invention, the invention encompasses kits comprising a bait having one or more magnetizable particles distributed therein in combination with fishhooks that are magnetic. In such kits the bait would typically be provided in a first container (such as a jar), and the hooks would be provided in a separate second container (such as a bag or box). The two containers would then together comprise the kit. An advantage of providing the bait and hooks together as kits is that such kits can provide a convenient packaging for consumers of fishing supplies. Specifically, for consumers intending to utilize magnetizable-particle containing fish bait in combination with a fishhook that is magnetic (rather than in combination with an ordinary metallic fishhook that is not magnetic), it can be more convenient to purchase the magnetic fishhooks and the bait comprising magnetizable particles as a single package, rather than having to search store shelves for separated packages of the individual kit components.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A baited fish hook assembly comprising:
   a magnetized fish hook;
   a plurality of magnetizable particles magnetically adhered to the fish hook, the magnetizable particles being separate, distinct pieces relative to one another; and
   a fish attractant adhered to the magnetizable particles, the fish attractant being configured to release odoriferous particles into water upon being submerged in the water.

2. The assembly of claim 1 wherein the fish hook comprises one or more planar side regions.

3. A fish bait comprising:
   a plurality of magnetizable particles which are separate and distinct pieces relative to one another; and
   a powdered fish attractant adhered to the magnetizable particles with an adhesive.

4. The fish bait of claim 3 wherein at least some of the magnetizable particles are magnets.

5. The fish bait of claim 3 comprising the magnetizable particles to a concentration of from about 1% to about 99.9%, by weight.

6. A fish bait comprising a fish attractant and a plurality of magnetizable particles distributed throughout the fish attractant to a concentration sufficient to adhere a visible amount of the fish attractant to a metal-containing fishhook under conditions wherein either at least some of the magnetizable particles are magnetic or the fishhook is magnetic, the magnetizable particles being separate, distinct pieces relative to one another.

7. The fish bait of claim 6 wherein the magnetizable particles are magnets.

8. The fish bait of claim 6 wherein the fishhook is a magnet.

9. The fish bait of claim 6 wherein the magnetizable particles are magnets and the fishhook is a magnet.

10. The fish bait of claim 6 comprising the magnetizable particles to a concentration of from about 1% to about 99.9%, by weight.

11. The fish bait of claim 6 comprising the magnetizable particles to a concentration of from about 25% to about 95%, by weight.

12. The fish bait of claim 6 comprising a consistency of a dough.

13. The fish bait of claim 6 comprising a consistency of a granular solid.

14. The fish bait of claim 6 wherein the magnetizable particles have a minimum dimension of not more than 0.25 inch.

15. A fishing bait and hook combination, comprising:
   a magnetic hook; and
   a bait having a plurality of magnetizable particles distributed therein, the magnetizable particles being separate and distinct pieces relative to one another.

16. The combination of claim 15 wherein the one or more magnetizable particles are magnets.

17. The combination of claim 15 wherein the bait comprises a fish attractant which releases particles when exposed to water, the particles being detectable by fish through at least one of the senses of smell and taste.

18. The combination of claim 15 wherein the one or more magnetizable particles are present within the bait to a concentration of from about 1% to about 99.9%, by weight.

19. The combination of claim 15 wherein the hook comprises one or more planar side regions.

20. The combination of claim 15 wherein the hook is a magnet.

21. A method of baiting a fish hook, comprising:
providing a magnetized fish hook;
providing a mass of bait having a fish attractant and a plurality of magnetizable particles dispersed within the fish attractant, the magnetizable particles being separate, distinct pieces relative to one another;
physically contacting the magnetized fish hook with the mass to magnetically attract at least a portion of the mass to the magnetized fish hook; and
removing the fish hook from the majority of the mass, at least some of the magnetically attracted portion of the mass remaining adhered to the fish hook through a magnetic interaction with the fish hook as the fish hook is removed.

22. The method of claim 21 wherein the magnetizable particles within the bait are magnets.

23. The method of claim 21 wherein the fish attractant within the bait is in the form of a powder adhered to the magnetizable particles with an adhesive.

24. A method of baiting a fish hook, comprising:
providing a magnetized fish hook;
providing a bait having a fish attractant and a plurality of magnetizable particles dispersed within the fish attractant, the magnetizable particles being separate, distinct pieces relative to one another;
inserting the magnetized fish hook within the bait;
withdrawing the magnetized fish hook from within the bait; and
after the withdrawing, at least one of the magnetizable particles from the bait being adhered to the fish hook through a magnetic interaction with the fish hook and at least a portion of the attractant being adhered to the at least one of the magnetizable particles.

25. The method of claim 24 wherein the fish attractant is configured to release odoriferous particles into water upon being submerged in the water.

26. The method of claim 24 wherein the fish attractant within the bait is in the form of a powder adhered to the magnetizable particles with an adhesive.

27. The method of claim 24 wherein the magnetizable particles within the bait are magnets.

28. The method of claim 24 wherein a plurality of the magnetizable particles from the bait are adhered to the fish hook after the withdrawing, and wherein a visible amount of the bait is adhered to the fish hook after the withdrawing.

* * * * *

UNITED STATES PATENT AND TRADEMARK OFFICE
CERTIFICATE OF CORRECTION

Page 1 of 2

PATENT NO. : 5,941,010
DATED : August 24, 1999
INVENTOR(S) : David G. Latwesen

It is certified that error appears in the above-indentified patent and that said Letters Patent is hereby corrected as shown below:

On the title page, item [56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 2 | 7 | 4 | 9 | 4 | 7 | 01/04/1994 | Griffiths | | | |
| | | 3 | 9 | 2 | 6 | 7 | 9 | 2 | 12/16/1975 | Buford | | | |
| | | 5 | 4 | 6 | 4 | 6 | 1 | 3 | 11/07/1995 | Barclay et al. | | | |
| | | 5 | 7 | 7 | 8 | 8 | 2 | 4 | 07/14/1998 | Musgrave et al. | | | |
| | | 5 | 8 | 1 | 5 | 9 | 7 | 8 | 10/06/1998 | Huddleson | | | |
| | | | | | | | | | | | | |
| | | | | | | | | | | | | |
| | | | | | | | | | | | | |

UNITED STATES PATENT AND TRADEMARK OFFICE
CERTIFICATE OF CORRECTION

PATENT NO. : 5,941,010
DATED : August 24, 1999
INVENTOR(S) : David G. Latwesen

It is certified that error appears in the above-indentified patent and that said Letters Patent is hereby corrected as shown below:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | JP | 4 | 0 | 3 | 1 | 3 9 2 6 | 3 A | 06/1991 | Japan | | | | |
| | JP | 4 | 1 | 0 | 1 | 7 9 1 0 | 2 A | 07/1998 | Japan | | | | |
| | JP | 4 | 0 | 8 | 1 | 0 7 0 1 | 5 A | 04/1996 | Japan | | | | |
| | JP | 4 | 0 | 5 | 1 | 1 1 3 5 | 2 A | 05/1993 | Japan | | | | |
| | JP | 4 | 0 | 3 | 2 | 7 2 6 3 | 5 A | 12/1991 | Japan | | | | |
| | JP | 3 | 6 | 3 | 2 | 0 7 3 6 | 1 A | 08/1988 | Japan | | | | |

Signed and Sealed this

Twenty-sixth Day of October, 1999

Attest:

Q. TODD DICKINSON

Attesting Officer       Acting Commissioner of Patents and Trademarks